No. 766,398. PATENTED AUG. 2, 1904.
L. C. SHARPLESS.
PROCESS OF MAKING BREAD.
APPLICATION FILED MAR. 23, 1901.
NO MODEL.
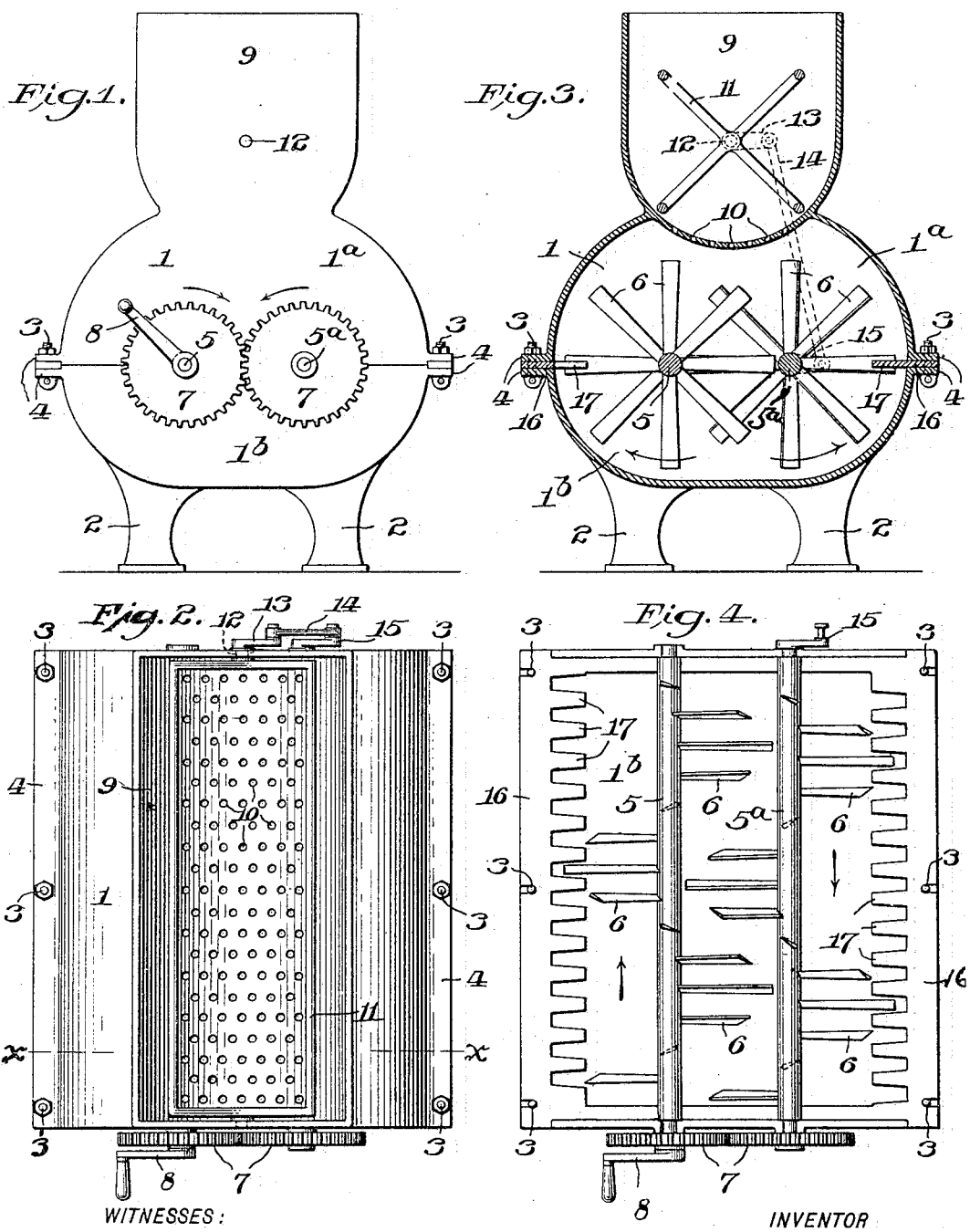
WITNESSES:
INVENTOR
Lydia Coale Sharpless,
BY
Walter C. Pusey
ATTORNEY No. 766,398. Patented August 2, 1904.

UNITED STATES PATENT OFFICE.

LYDIA COALE SHARPLESS, OF PHILADELPHIA, PENNSYLVANIA, ASSIGNOR TO CYRUS CHAMBERS, JR., OF OVERBROOK, PENNSYLVANIA.

PROCESS OF MAKING BREAD.

SPECIFICATION forming part of Letters Patent No. 766,398, dated August 2, 1904.

Application filed March 23, 1901. Serial No. 52,475. (No specimens.)

*To all whom it may concern:*

Be it known that I, LYDIA COALE SHARPLESS, a citizen of the United States, residing in the city and county of Philadelphia, State of Pennsylvania, have invented certain new and useful Improvements in Processes of Making Bread, of which the following is a full, clear, and exact description.

My invention relates to an improved process of making bread.

Bread made by the ordinary methods is quite indigestible by reason of the free flour existing therein, or rather by reason of the uncooked—that is, unburst—starch-granules in such bread.

A starch-granule that is not burst in the baking is quite indigestible, while one that is so burst is easily digestible and an excellent food.

My chief object has, therefore, been to produce a bread in which when baked the starch-granules shall be thoroughly saturated and "changed" during the baking, thus rendering the bread not only more readily digestible, but quite palatable. After numerous experiments and microscopic examinations I discovered that a way by which this result could be attained was by completely enveloping each individual flour particle with moisture and not pressing the particles together, so that each of said flour particles may fully expand and so swell and burst when baked, which latter does not occur to a large proportion (often as high as twenty-five per cent.) of the flour particles in bread made by the processes in common use.

In the ordinary most common methods of making bread a batter composed of flour, water, yeast, and other ingredients is mixed and set to "rise," and after this rising of the "sponge" more flour is kneaded into it to form the dough, and after being allowed to rise again for a short time the dough is placed in the oven and baked; but the defect in this method of making bread, as in all others with which I am familiar, is that partially owing to kneading in the flour the flour particles are but imperfectly and many not at all enveloped by moisture, and they are so tightly pressed or mashed together that they cannot expand, and hence will not burst during the baking. It will also be observed in the bread made by the well-known processes that there occur large gas-bubbles surrounded by an envelop of glutinous matter interspersed with unburst of free starch particles. For a reason hereinafter appearing these large gas-bubbles do not occur in bread made by my process.

My improved process consists, essentially, in mixing the flour into the moisture and other ingredients usual in making bread in such manner that each individual granule of flour will be enveloped in a coating of moisture and such mixing of the flour and moisture taking place practically without any pressure upon the flour particles, thus permitting each particle to stand out, as it were, by itself and held only in light contact with its neighbor-boring particles by the glutin instead of being mashed and pressed together into close contact with each other and forming lumps of flour throughout, as in ordinary kneaded bread.

In carrying out my improved process I have found it desirable to use a convenient apparatus or machine for mixing the ingredients, such as illustrated in the drawings hereunto annexed, although I do not confine myself to this particular form of apparatus, it being merely one which I have successfully used in carrying out my invention.

In said drawings, Figure 1 is an end elevation; Fig. 2, a plan view; Fig. 3, a vertical section as on the line $x\,x$, Fig. 2; and Fig. 4 a plan view, the upper part of the device having been removed.

1 is a vessel or receptacle preferably supported upon legs 2. Said vessel is divided longitudinally and horizontally into an upper portion $1^a$ and a lower portion or basin $1^b$, normally secured together in any well-known manner, such as by thumb-screws 3, passing through contiguous flanges 4 of the said upper and lower portions of the vessel.

Journaled in bearings in the ends of the vessel 1 are two shafts 5 5ª, which shafts carry blades 6. The shafts 5 and 5ª are geared together by gear-wheels 7, and one of said shafts is provided with a winch 8 for imparting rotation thereto. The blades 6 are so set on their respective shafts that when said shafts are rotated, as indicated by the arrows in Figs. 1 and 3, the blades on one shaft, 5, will tend to draw the material within the vessel 1 toward one end thereof, while the blades on the other shaft, 5ª, tend to draw it (the material) toward the other end of the vessel, as indicated by the arrows in Fig. 4, the blades on the respective shafts interdigitating with one another in their rotation, all as seen in Figs. 3 and 4.

In the upper part of the vessel 1 and carried by the portion 1ª thereof is a flour-sifter 9, the perforations 10 in the bottom of which are in line with and above the blades 6. Within said sifter is journaled an agitating-frame 11, such as is well known in flour-sifters, and on the outer end of one of the arbors 12, on which said frame is carried, is a crank-arm 13, which is connected by a rod 14 with a similar crank-arm 15 on the shaft 5ª. Clamped between the upper and lower portions 1ª and 1ᵇ of said vessel 1 is a frame 16, from which project inwardly and on opposite sides of the vessel fingers 17, between which the blades 6 are adapted to pass in their rotation, said fingers serving to strip said blades of any excess of dough and preventing its rotation with the blades.

The manner of performing my improved process, utilizing the machine which I have just described, is as follows: A suitable quantity of water or water and milk—say two quarts—together with, say, a cup of yeast and proper quantities of the other ingredients usually used in making bread except the flour, are placed in the lower part of the vessel or basin thereof, 1ᵇ, and the upper portion 1ª thereof is secured in place. A suitable quantity of flour—say six and one-fourth pounds—is now placed in the sifter 9. The winch 8 now being turned rotates the knife-carrying shafts 5 5ª, and also through the medium of the crank-arms 13 and 15 and their connecting-rod 14 the agitator 11 of sifter 9 is reciprocated back and forth, thus sifting a definite though small quantity of flour through the sifter-holes 10 at each reciprocation. The said flour falls lightly into the basin 1ᵇ of vessel 1 and is caught by the blades 6 in their rotation, which blades draw it lightly and without pressure through the liquid in the basin 1ᵇ, and after a stiff batter or dough has been formed said knives draw or pull the same apart in the air in said vessel, thus thoroughly aerating the same. Thus each individual flour particle or granule is enveloped in liquid and is only in loose contact with its adjacent flour particles instead of being mashed or pressed into lumps, as in the usual kneading process of making bread. When the handle or winch 8 has been turned for, say, about five minutes, the top portion 1ª of the vessel is removed and the knife-carrying shafts 5 5ª are removed, as also the frame 16, with the fingers 17, projecting therefrom between the blades 6, and the dough in lower portion or basin 1ᵇ of the vessel is set to rise. Now, as hereinbefore stated, as each individual particle of flour stands out, as it were, by itself, no lumps being formed in the dough, when the yeast begins to act on the flour, forming the carbon dioxid, the said gas is disseminated evenly throughout the mass of dough, forming small bubbles of very regular and even size, and each individual flour particle will expand or swell up somewhat similar to grains of rice if placed in water. After the dough has sufficiently risen it is removed from the basin 1ᵇ, made into loaves, and placed in an oven to bake in the ordinary well-known manner without adding thereto any additional flour. When the loaves are baked and removed from the oven, an examination thereof under the microscope will show that substantially every individual starch-granule throughout the entire mass has been burst in the cooking—something which does not occur in bread formed by any other process with which I am familiar—and it is well known that an unburst starch-granule is quite indigestible, while one that has been burst in the baking is readily assimilated; also, the loaves will be of very even texture, free from large air-bubbles and light and very palatable, having a peculiar nutty sweet taste not present in any other bread with which I am familiar.

Having thus described my invention, I claim as new and desire to secure by Letters Patent—

A process of making bread which consists in sifting lightly into the liquid, yeast, and other ingredients usual in making bread, the flour, and simultaneously therewith drawing said flour through the liquid without pressure, whereby each individual flour particle is enveloped in a uniform quantity of liquid, and is held in loose contact only with its adjacent flour particles, pulling the dough thus formed apart in the air, setting the dough thus formed to rise, and after rising baking the same, substantially as and for the purpose set forth.

In testimony whereof I have hereunto affixed my signature this 12th day of March, A. D. 1901.

LYDIA COALE SHARPLESS.

Witnesses:
ANDREW V. GROUPE,
WALTER C. PUSEY.